No. 627,509. Patented June 27, 1899.
H. E. KOCH.
BRIDGE.
(Application filed Aug. 17, 1898.)
(No Model.)
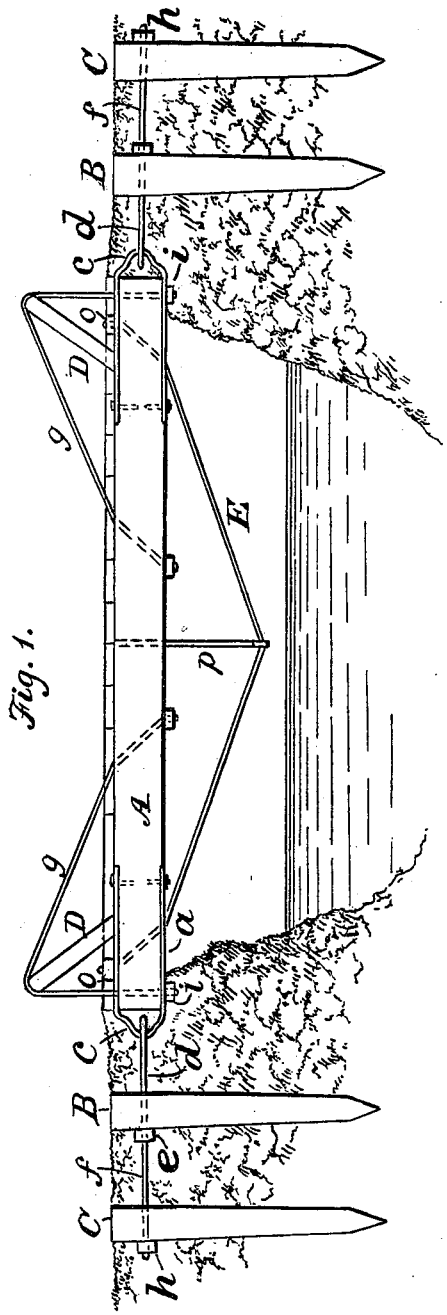
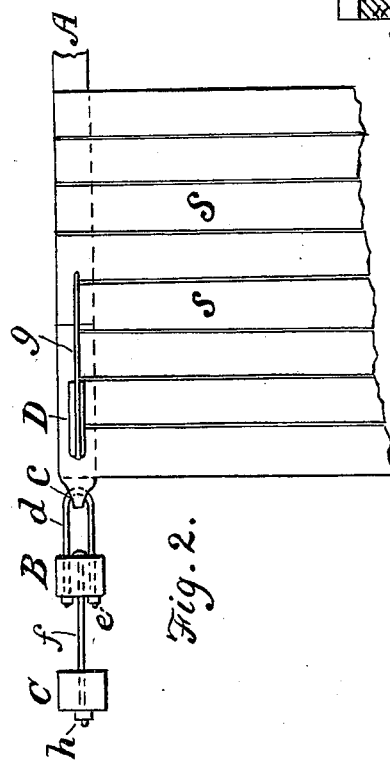
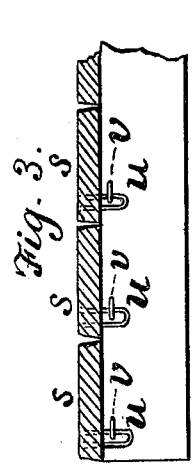
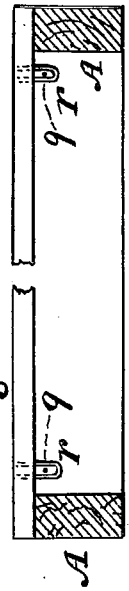
Witnesses:
Inventor:
Henry E. Koch
By H. A. Daniels, Atty

UNITED STATES PATENT OFFICE.

HENRY E. KOCH, OF HARTINGTON, NEBRASKA.

BRIDGE.

SPECIFICATION forming part of Letters Patent No. 627,509, dated June 27, 1899.

Application filed August 17, 1898. Serial No. 688,791. (No model.)

*To all whom it may concern:*

Be it known that I, HENRY E. KOCH, a citizen of the United States, residing at Hartington, in the county of Cedar and State of Nebraska, have invented certain new and useful Improvements in Bridges; and I do hereby declare the following to be a full, clear, and exact description of the invention, such as will enable others skilled in the art to which it appertains to make and use the same.

This invention relates to bridges; and it consists in certain improvements in the construction of the same, as hereinafter described and claimed, the object of the invention being to provide a cheap and strong bridge for streams and brooks where they are crossed by country roads.

In the accompanying drawings, Figure 1 represents a side view of a bridge constructed according to my invention. Fig. 2 represents a portion of the bridge in plan. Fig. 3 illustrates one form of construction of the roadway of the bridge in section. Fig. 4 shows a modification in construction.

A designates the side beams of the bridge, to the extremities of which are firmly secured the irons $a$, each of which is fastened to the upper and lower sides of a beam at one end thereof and is formed with a loop or link connection $c$. The side beams are connected with posts or piles, which are set or driven into the ground for the purpose of holding the bridge firmly in place. Each loop $c$ is connected with a set-post B by a rod $d$, which is bent in the form of a staple, the two ends of the rod being passed through said post and secured by nuts $e$. Another rod $f$ or bolt having a head is passed centrally through the post B and through another post C and secured by a nut $h$, the post C being set in the ground a suitable distance from the post B. Two posts at each end of each side beam are shown, but more than two may be employed, with like connections, for the security of the bridge.

The side beams are provided with strengthening-braces, some of which extend above and others below the beams to which they are secured. Two upper brace-rods $g$ are mounted on each side beam and are supported in position by the inclined posts D, fixed on the beam, the ends of the rods being passed through the beam and secured by nuts $i$. Connected with each side beam is a lower brace-rod E, the ends of said rod being passed upward through said beam near its extremities and secured by nuts $o$. The rod E is supported in position by a rod $p$, fixed to and extending downward from the side beam.

The planks $s$ of the bridge-flooring are loosely connected with the side beams, having hinge connections with said beams, so that in times of flood the planks may be raised laterally by the rising water and will fall to their proper position as the water recedes, thus reducing the upward pressure of water against the bridge and rendering the latter less liable to be displaced by high water.

In Fig. 3 is shown one form of hinge-coupling of planks $s$ with the side beams, the coupling consisting of staples $u$, which are fixed to the plank near one edge, and staples $v$, fixed to the side beams. Another form of coupling is shown in Fig. 4, in which staples $r$ are fixed to the plank, and two rods $q$ are fixed in position parallel with the side beams and extend through the staples. The bridge thus constructed, being provided with the bracing-rods connected with the side beams, is very strong and is held very firmly in place by the connections of the side beams with the sunken posts.

I claim—

1. The combination with the side beams of a bridge, of coupling-irons fastened to said side beams at their extremities, a series of posts which are set in the ground, some of said posts being opposite each end of said side beams, and rods connecting said posts one with another and with said side beams, substantially as and for the purposes described.

2. The combination with the side beams, provided with coupling-irons secured to the ends of said beams, of a series of posts which are set in the ground, one being near each end of a side beam and connected with a coupling-iron of said beam, substantially as set forth and described.

3. The combination with the framework of a bridge, of planks forming the roadway of said bridge, said planks being loosely connected by hinge-couplings with said framework, substantially as and for the purpose described.

4. The combination with the side beams of a bridge, of the coupling-irons $c$, sunk posts B and C, connected by rods with said coupling-irons, posts D and rods $g$, connected with and extending above said side beams, and bracing-rods E and $p$, connected with and extending below said side beams, all being constructed substantially as and for the purposes described.

In testimony whereof I have affixed my signature in presence of two witnesses.

HENRY E. KOCH.

Witnesses:
 OTTO H. KUHL,
 CHAS. A. VAN DORN.